United States Patent
Yamamoto et al.

(10) Patent No.: US 6,706,426 B1
(45) Date of Patent: Mar. 16, 2004

(54) LONGITUDINAL MAGNETIC RECORDING MEDIA

(75) Inventors: Tomoo Yamamoto, Hachioji (JP); Akira Ishikawa, Kokubunji (JP); Kazusuke Yamanaka, Shiroyama (JP); Atsushi Nakamura, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/523,521

(22) Filed: Mar. 10, 2000

(30) Foreign Application Priority Data

Mar. 18, 1999 (JP) .......................................... 11-073767

(51) Int. Cl.$^7$ ................................................ G11B 5/64

(52) U.S. Cl. .................................. 428/694 TS; 360/46

(58) Field of Search ......................... 360/48, 137, 69; 428/694 TS

(56) References Cited

U.S. PATENT DOCUMENTS

| | | | |
|---|---|---|---|
| 5,693,426 A | 12/1997 | Lee et al. | |
| 5,922,456 A | * 7/1999 | Tanahashi et al. | 428/332 |
| 6,248,416 B1 | * 6/2001 | Lambeth et al. | 360/135 |
| 6,403,240 B1 | * 6/2002 | Kanbe et al. | 428/694 TS |

FOREIGN PATENT DOCUMENTS

JP 10-162336 6/1998

OTHER PUBLICATIONS

The control and characterization of the Crystallographic Texture of Longitudinal Thin Film Recording Media by Laughlin et al, IEEE Transactions on magnetics vol. 32 No. 5, Sep. 1996.*

Experiment al Study of Thermal Decau in high–density Magnetic Recording media by: Y. Hosoe et p. 3028–3030 IEEE Transactions of Magnetics. vol. 33, No. 5 Sep. 1997.

* cited by examiner

Primary Examiner—David Hudspeth
Assistant Examiner—Varsha A. Kapadia
(74) Attorney, Agent, or Firm—Antonelli, Terry, Stout & Kraus, LLP

(57) ABSTRACT

To obtain a large capacity magnetic recording medium capable of recording at a super high density of 3 Gbit or more per one square inch and a magnetic storage apparatus, a magnetic recording medium is prepared by disposing orientation control layers 31, 31' having at least a B2 (CsCl) structure on a substrate 30, disposing a first underlayer comprising Cr and a second underlayer containing at least one element selected from Cr, Nb, Mo, Ta, W and Ti and having a lattice constant greater than that of the first underlayer and then forming a magnetic layer comprising Co as the main ingredient. A magnetic storage apparatus is constituted by combining the magnetic recording medium, a magnetic head comprising a recording system and a read out system opposed to each of the surfaces of the magnetic recording medium, a unit for moving the magnetic head relative to the magnetic recording medium and a read/write signal processing system for waveform processing of input signals and output signals to and from the magnetic head.

9 Claims, 7 Drawing Sheets

LONGITUDINAL MAGNETIC RECORDING MEDIA

BACKGROUND OF THE INVENTION

The present invention concerns a longitudinal magnetic recording medium, such as magnetic recording drums, magnetic recording tapes, magnetic recording disks and magnetic recording cards, as well as a magnetic storage apparatus and, more particularly, the invention relates to a longitudinal magnetic recording medium which enables super high density recording at 3 Gbit or more per one square inch, and a magnetic storage apparatus using the longitudinal magnetic recording medium.

In recent years, the sizes of recording bits formed on a magnetic recording medium have been reduced more and more along with a remarkable increase in the capacity and recording density of magnetic recording disks. In the magnetic recording medium known at present, it is difficult to attain a super high density recording of 3 Gbit or more per one square inch, and there is a need to further decrease the medium noises. For this purpose, it is important to decrease the crystal grain size of the magnetic layers. However, when the volume of the magnetic particles is reduced extremely by the refinement of the magnetic crystal grains, the effect of the thermal energy becomes remarkable even at normal temperatures, which raises a concern that the recorded magnetization will decay. Actually, it has been reported by Y. Hosoe, et al, that information recorded at a density of 225 kFCI (FCI: Flux Change/Inch) is decayed by as much as 10% or more after 96 hours in a noise-reduced medium (IEEE Trans. Magn. 33, pp, 3028–3030, September 1997).

For making the reduction of the medium noises compatible with an improvement of the heat resistant fluctuation performance, it is effective to decrease the average crystal grain size of the magnetic membrane and, at the same time, suppress the growing of extremely small magnetic particles.

As an example of a magnetic recording medium of this type, it has been proposed, for example, in U.S. Pat. No. 5,693,426, by CMU (Carnegie Mellon University), to produce a magnetic recording medium using an under layer having a B2 (CsCl) structure laminated directly thereon or by way of a Cr underlying film, the magnetic layer thereby making the magnetic crystal grains into a non bi-crystal structure.

FIG. 2 is a view illustrating an epitaxial relationship between an underlayer and a magnetic layer of a magnetic recording medium according to the technique proposed by CMU, which will be explained. FIG. 2 shows a crystal structure for an NiAl underlayer, a Cr underlayer and a Co magnetic layer from below. In FIG. 2, the group on the left illustrates the shape of the crystals in which a meshed plane represents a portion growing in parallel with a substrate, and the group on the right shows a representative size of the meshed plane.

The crystal structure for each of the layers is: B2 for the NiAl underlayer, (b.c.c.) for the Cr underlayer and (h.c.p.) for the Co magnetic layer. When the NiAl underlayer is formed on the substrate while optimizing the deposition condition, crystals grow preferentially such that (211) is in parallel with the substrate. The Cr underlayer formed thereon shows substantial orientation (211) and, further, the magnetic layer shows substantial orientation (10.0).

When atoms are located at lattice points of crystals possessed by each of the layers, when each of the layers has the orientation as described above, a rectangle is formed in a film plane as shown on the left of FIG. 2. As a result, when each of the layers is formed successively on the substrate, a layer structure is obtained in which meshed portions in FIG. 2 are stacked successively. When the sizes of the rectangles are compared, while using the bulk value for the lattice constant of each of the layers, it can be seen that they are substantially of the same size in the [0001] direction of the magnetic layer (direction of c-axis), that is, in the direction of the axis of easy magnetization. On the other hand, when the length of the sizes of the rectangles formed with the respective layers are compared in the direction perpendicular thereto, that is, in the [1–210] direction of the magnetic layer, it can be seen that the sizes are different.

According to the result of an experiment conducted by the present inventors, it has been found that the orientation of the axis of easy magnetization to the in-plane direction can be improved particularly by making the sizes of the respective rectangles formed by the underlayer adjacent to the magnetic layer and the magnetic layer substantially equal to each other. For a medium having the structure proposed by CMU, when the rectangles formed by the Co magnetic layer and the Cr underlayer adjacent to the magnetic layer are compared, the length of the sizes are substantially equal in the [0001] direction of the magnetic layer, but the length for the side of the rectangle formed by the underlayer is excessively small in the [1–210] direction perpendicular thereto. In a case where such a size difference exists, the in-plane orientation of the axis of easy magnetization of the magnetic layer is remarkably deteriorated, resulting in a decrease of the coercivity and an increase in the media noise. Further, for the purpose of increasing the coercivity and the reduction of the media noise, elements such as Pt, Ta, Ti, Nb are added generally to the magnetic layer. Therefore, the unit lattice (lattice constant) of the magnetic layer having the h.c.p. structure, that is, the size of the rectangle formed by the alloy magnetic layer is greater than that of Co, and, in the longitudinal magnetic recording medium having a structure in which a Cr underlayer is formed on the underlayer having the B2 structure of NiAl, etc. proposed by CMU, lattice matching between the Cr underlayer and the Co alloy magnetic layer is further deteriorated, thereby to worsen the in-plane orientation of the axis of easy magnetization.

Since the magnetic recording medium proposed by CMU as described above is a longitudinal recording medium, it is preferred that the axis of easy magnetization of the medium is oriented within a plane for attaining high coercivity and reduced noise. Generally, since the magnetic layer comprises Co as the main ingredient, the crystal structure has a substantially hexagonal closed packed lattice with the direction of the axis of easy magnetization being in the direction of the c axis. Then, in the magnetic recording medium in which a magnetic layer is formed on the B2 (mainly comprising NiAl) underlayer directly or by way of the Cr underlayer proposed by CMU, the axis of easy magnetization of the medium shows an in-plane orientation when the c-axis length of the magnetic layer has a size nearly equal to that of Co. However, in the usual magnetic layer, elements such as Pt, Ta, Ti or Nb are added as described above with an aim of improving the coercivity and reducing the media noise. In this case, the lattice constant of the magnetic layer is made greater compared with that of Co, thereby to bring about a problem in that the matching property with the lattice of the B2 underlayer or the Cr underlayer is deteriorated and the in-plane orientation of the axis of easy magnetization is worsened.

A first object of the present invention is to provide a longitudinal magnetic recording medium of high coercivity, reduced noise and which has an excellent thermal decay resistance, by developing the magnetic recording medium of the structure proposed by CMU and improving the in-plane orientation of the axis of the easy magnetization also for the magnetic layer with the addition of an element such as Pt, Ta, Ti or Nb.

A second object of the present invention is to provide a magnetic storage apparatus having a recording density of 3 Gbit or more per square inch, while fully talking an advantage of the performance of the longitudinal magnetic recording medium.

SUMMARY OF THE INVENTION

At first, an explanation will be given of the basic concept of the present invention for solving the problem that the lattice matching between the Cr underlayer and the Co alloy magnetic layer is deteriorated to worsen the in-plane orientation of the axis of easy magnetization in the longitudinal magnetic recording medium of a structure, in which a Cr underlayer is formed on an underlayer having a B2 structure, such as NiAl proposed by CMU.

That is, for solving the foregoing problem, it is important to add an element having an atomic radius larger than that of Cr to the underlayer adjacent with the magnetic layer thereby increasing the length of the side of the rectangle so that it is somewhat larger in the [0001] direction and somewhat smaller in the [1–210] direction of the magnetic layer.

Further, according to the result of the experiment conducted by the present inventors, it has been found that when an underlayer having a lattice constant greater than that of Cr is formed directly on an NiAl underlayer (hereinafter referred to as an NiAl orientation control layer), the lattice matching between the NiAl orientation control layer and the underlayer is deteriorated to worsen the orientation of the underlayer and, simultaneously, make the crystal grain size coarser, resulting in deterioration of the coercivity squareness and an increase in the minimum magnetization reversal volume. Deterioration of the coercive squareness deteriorates the resolution upon high density recording (capability of signal recording), and an increase in the minimum magnetization reversal volume increases the media noise. The Cr underlayer formed on the NiAl orientation control layer put to the (211) orientation tends to show a (211) orientation, for example, by reason of lattice matching or chemical stability. On the other hand, it has been found that since the second underlayer formed on the NiAl orientation control layer oriented in the (211) direction and having a lattice constant greater than that of the first Cr underlayer has a lattice larger than that of the Cr underlayer and contains an element different from Cr, the (110) orientation develops in addition to the (211) orientation for the reason, for example, of lattice matching or chemical stability.

The fundamental structure of the magnetic recording medium according to the present invention has a feature, as shown in FIG. 1, in a dual layer underlayer structure in which a first Cr underlayer is disposed on an NiAl orientation control layer and a second underlayer having a lattice constant greater than that of Cr is disposed thereon. This construction is based on the finding that a high coercivity of the medium can be attained with such a structure without deteriorating the coercivity squareness and with the axis of easy magnetization being oriented in-plane of the magnetic layer.

FIG. 1 is a view showing the structure of a magnetic recording medium based on the basic concept of the present invention relative to the underlayer and the magnetic layer of the magnetic recording medium proposed by CMU, and the figure shows an epitaxial relationship in a case where a first Cr underlayer is disposed on an NiAl orientation control layer and a second underlayer having a lattice constant greater than that of Cr is disposed thereon to provide a dual underlayer structure, which will be explained hereinafter. FIG. 1 shows the crystal structure for an NiAl underlayer, a first Cr underlayer, a second CrTi underlayer and a Co magnetic layer successively from below. The meaning of the meshed portion in FIG. 1 is identical with that shown in FIG. 2.

When the crystallographic orientation of the magnetic recording medium according to the present invention was examined by a θ–2θ scan method using an X-ray diffraction device, the B2 orientation control layer did not completely orient in the (211) direction, but contained some (110) component. In this case, the underlayer also contained (211) and some (110) components. From the magnetic layer, intense (10.0) and weak (00.2) and (10.1) were detected. As the feature of the present invention, it is important that (11.0) is not detected as the X-ray diffraction component from the magnetic layer.

A magnetic recording medium having a dual underlayer, in which a second CrMo alloy underlayer is formed on a first Cr underlayer, has been described, for example, as descried in Japanese Published Unexampled Patent Application Hei 7-21543. However, this technique forms the first Cr underlayer directly on the substrate, which is greatly different from the magnetic recording medium according to the present invention, in that an orientation control layer having a B2 structure is not disposed between the substrate and the first underlayer. If the orientation control layer having the B2 structure is not provided, the underlayer orients in the (100) direction and the magnetic layer thereon orients in the (11.0) direction. In this case, while the axis of easy magnetization of the magnetic layer orients in the plane of the layer, it takes a structure in which a plurality of magnetic crystal grains in which the axes of easy magnetization are perpendicular on one of the underlayer crystal grains (bi-crystal structure). When the magnetic layer has such a structure, it is difficult to control the crystal grain size to form crystal grains of extremely small size, which tends to undergo the effect of thermal fluctuation as explained above, and the read output is decreased with lapse of time.

Further, since the Cr segregation effect is small between the grains having the bi-crystal structure, the inter grain action is strengthened and an effective anisotropic energy is decreased to lower the coercivity. Such a phenomenon becomes remarkable particularly in a region of the magnetic layer in which the magnetization is made smaller, and the product of the residual magnetic flux density and the thickness of the magnetic layer is 70 G·μm or less to bring about d serious problem. The feature of the present invention for solving such a problem is to epitaxially grow the (10.0) oriented magnetic layer by orienting first and second underlayers in the (211) direction thereby growing one magnetic crystal grain on one underlayer crystal grain, namely, not having a bi-crystal structure.

One of the means adopted for this purpose is the provision of an orientation control layer having a B2 structure between the substrate and the underlayer. For the magnetic recording medium according to the present invention, it has been confirmed by the θ–2θ scan method using an X-ray diffraction device that (10.0) of the magnetic layer is detected in a plane parallel with the substrate, but (11.0) is not detected.

As described above, when the orientation control layer having the B2 structure is disposed between the substrate and the underlayer, not only will the preferential orientation face of the underlayer change, but also the fine structure of the magnetic layer is changed, so that it is possible to provide a magnetic recording medium of higher coercivity, lower noise and with an excellent thermal decay resistance compared with the magnetic recording medium having a simple dual underlayer.

The second underlayer in FIG. 1 preferably contains at least one element selected from Cr, Mo and Ti, and has a lattice constant greater than that of Cr and, particularly, preferably comprises a composition of Cr and Ti from 5 at. % to 50 at. % of Ti, Cr and from 5 at. % to 100 at. % of Mo, or Cr, Mo and Ti for increasing the in-plane orientation of the axis of easy magnetization of the magnetic layer. However, it is important that the second underlayer has a crystal structure of b.c.c. The alloy of Cr and Mo used for the second underlayer is in a relation of complete series of solid solution in view of the fact that the phase diagram of bulk metal and the crystal structure of the alloy is always in b.c.c., so that it is easy to handle with and particularly preferred for preparing crystals having an optional size of lattice. Further, in a case of using an alloy of Cr and Ti, since the crystal grains of the underlayer can be made smaller and the crystal grain size of the magnetic layer grown thereon can also be made smaller, it is particularly preferred from the point of view of reducing the noises.

However, since Ti has a crystal structure h.c.p. in the Cr—Ti alloy, Ti in the composition of the second underlayer has to be 50 at. % or less based on the entire part. The second underlayer comprising Cr, Mo and Ti succeeds the natures of Cr—Mo, Cr—Ti in accordance with the concentration of the respective elements. When elements other than Cr, Mo, Ti are used for the second underlayer, it is preferred to use Nb, Ta, Mo (however, the characteristic is somewhat poor compared with Cr, Mo, Ti). Use of other elements than the above is not preferred since the orientation of crystals is distorted, or the crystal grain size is made coarser, resulting in a lowering of the coercivity or an increase in the media noise.

The magnetic layer preferably contains from 15 at. % to 25 at. % of Cr and from 4 at. % to 25 at. % of Pt for increasing the coercivity and reducing the media noise. Further, in a case of adding Ta, Ti, Nb for reducing the noise, it is important to control the concentration for the total of the elements to 8 at. % or less in order to prevent non magnetization of the magnetic layer. In the composition of the magnetic layer, at least Co of 62 at. % or more is necessary. If the Co concentration is 62 at. % or less, the magnetic flux density lowers remarkably to decrease magnetic fluxes which leak from the medium, making it difficult to read out signals with the magnetic head.

When the magnetic layer having a h.c.p. structure is epitaxially grown on an underlayer having a b.c.c. structure, since grains of different kinds of crystal structures are compulsorily subjected to crystal growth, defects are introduced in the initial state of the crystal growth of the magnetic layer or fine magnetic crystal grains are formed. Such defects or fine particles tend to intensely undergo the effect of thermal fluctuation and a decreasing ratio of the read output with elapse of time increases after recording the signals. For minimizing the effect as much as possible, it is preferred to interpose an intermediate layer having a non-magnetic h.c.p. structure between the underlayer and the magnetic layer. The non-magnetic h.c.p. intermediate layer absorbs defects or fine particles formed at the boundary with the b.c.c. underlayer to prevent undesired effects on the magnetic layer. As the material for the non-magnetic h.c.p. intermediate layer, use of a material comprising Co with the addition of at least 25 at. % or more of Cr or a material comprising Co and Ti or Ti as the main ingredient is preferred.

As a result of the consideration described above, the foregoing object of the present invention can be attained by disposing at least an orientation control layer having a B2 structure on a substrate, disposing thereon, a first underlayer comprising Cr and a second underlayer containing at least one element selected from Cr, Nb, Mo, Ta, W and Ti and comprising Cr having a lattice constant greater than that of the first underlayer, and then forming a magnetic layer comprising Co as the main ingredient.

Further, the object of the present invention can be attained by using an alloy comprising, as the main ingredient, at least one member selected from Al—Co, Al—Fe, Al—Ni, Al—Pd, Co—Ga, Co—Fe, Co—Ti. Ci—Pd, Cu—Zn, Ga—Ni, Ga—Rh and Ru—Si for the orientation control layer having the B2 structure, in which the crystal grain size can be refined and the in-plane orientation of the axis of easy magnetization of the magnetic layer can be improved.

Further, a magnetic storage apparatus having a recording density of 3 Gbit or more per one square inch can be attained in a magnetic storage apparatus comprising a longitudinal magnetic recording medium according to the present invention, a driving section for driving the longitudinal magnetic medium in a recording direction, a magnetic head comprising a recording section and a read out section, means for relatively moving the magnetic head to the longitudinal magnetic recording medium and a recording/reading signal processing means for applying waveform processing to input signals and output signals relative to the magnetic head, by constituting the read out section of the magnetic head with a magnetoresistive head.

DETAILED DESCRIPTION OF THE INVENTION

Preferred embodiments of a longitudinal magnetic recording medium and a magnetic storage apparatus according to the present invention will be explained specifically with reference to the drawings.

Figure 3:
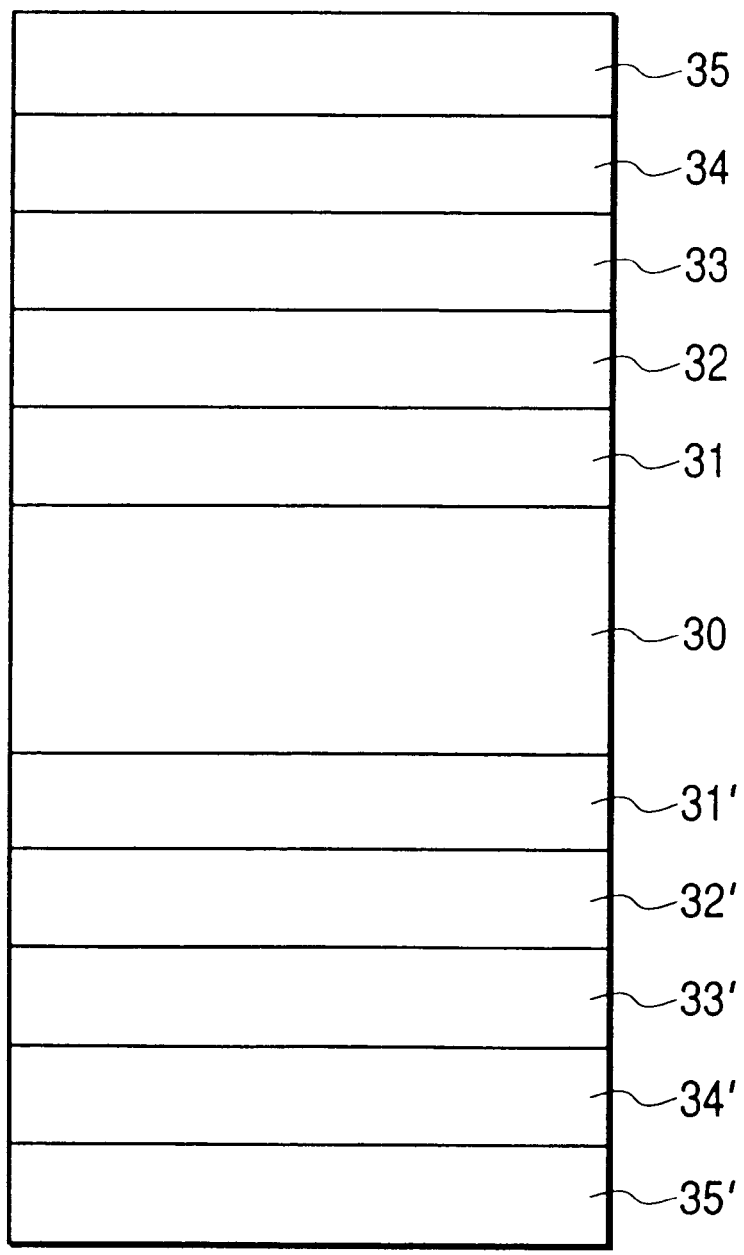
FIG. 3 is a diagrammatic showing a cross sectional structure of a longitudinal magnetic recording medium according to a preferred embodiment of the present invention.

FIG. 3 is a cross sectional view of a longitudinal magnetic recording medium representing one embodiment according to the present invention. In FIG. 3, the recording medium comprises a substrate 30, orientation control layers 31, 31', first Cr underlayers 32, 32', second Ti underlayers 33, 33', magnetic layers 34, 34' and protective layers 35, 35'.

The longitudinal magnetic recording medium for the first embodiment of the present invention, as shown in FIG. 3, is constituted by successively forming, on both surfaces of the substrate 30 made of glass or the like, the orientation control layers 31, 31' made of Al-50 at. %Ni, the first underlayers 32, 32', the second Ti underlayers 33, 33', the magnetic layers 34, 34' made of Co-20 at. % Cr-12 at. % Pt and the C protective layers 35, 35'.

A method of manufacturing the longitudinal recording medium according to the preferred embodiment of the present invention having the foregoing structure will be explained.

At first, onto a glass substrate 30 of 65 mmφ in outer diameter, the orientation control layers 31, 31' are formed each comprising Al-50 at. % Ni. The layers 31, 31' are each formed to a depth of 50 nm by a DC magnetron sputtering method under deposition conditions including a substrate temperature of 270° C., an Ar gas pressure of 2.0 mtorr, and with a charged electric power density of 0.7 W/cm². Then, under the same deposition conditions as described above, the first Cr underlayers 32, 32' are each formed to a depth of 20 nm, and the second underlayers 33, 33' comprising Cr-20 at. % Ti are each formed to a depth of 20 nm, and the magnetic layers 34, 34' comprising Co-20 at. % Cr-12 at. % Pt are each formed to a depth of 20 nm, successively. Finally, C was formed to a depth of 10 nm as the C protective layers 35, 35'. The numerals attached to the elements for the alloy composition show the concentration of the element.

Then, the example of measuring the magnetic properties and the media noise of the longitudinal magnetic recording medium in the preferred embodiment according to the present invention prepared as described above will be explained with reference to Table 1. Also, a medium not including the first Cr underlayers 32, 32' and the second Ti underlayers 33, 33' was prepared as Comparative Example 1, and a medium not including the second Ti underlayers 33, 33' was prepared as Comparative Example 2 (structure proposed by CMU). Further, a medium not including the first Cr underlayers 32, 32' was also manufactured as Comparative Example 3.

TABLE 1

|  | Hc[kOe] | S* | Brt[Gum] | Noise |
| --- | --- | --- | --- | --- |
| Example 1 | 3.600 | 0.85 | 75 | 1.0 |
| Comp. Example 1 | 1.62 | 0.65 | 72 | 2.0 |
| Comp. Example 2 | 2.15 | 0.56 | 73 | 1.8 |
| Comp. Example 3 | 2.40 | 0.50 | 73 | 1.7 |

Values for the media noise shown in Table 1 are those for recording signals at 250 kFCI, assuming that the measured value in the case of the preferred embodiment of the invention is 1, and the measured values for the comparative examples are shown as values relative to the measured values for the preferred embodiment of the present invention. It can be seen that the medium of the preferred embodiment has the highest coercivity (Hc) and a low media noise. Further, the medium of the preferred embodiment according to the present invention has the highest coercivity squareness (S*), and it can be expected that the resolution is satisfactory.

TABLE 2

|  | CoCrPt (10.0) Diffraction Intensity |
| --- | --- |
| Example 1 | 1.0 |
| Comp. Example 1 | 0.3 |
| Comp. Example 2 | 0.5 |
| Comp. Example 3 | 0.7 |

Table 2 shows the result of the measurement of the diffraction intensity for the CoCrPt magnetic layer (10.0) by X-ray diffractiometry. Also in Table 2, measured values for the comparative examples are shown by relative values assuming that the value for the medium of the preferred embodiment according to the present invention is 1. For the diffraction intensity, a greater value shows that the axis of easy magnetization orients more in the plane of the magnetic layer. From Table 2, it can be seen that the preferred embodiment of the present invention shows the strongest diffraction intensity and the axis of easy magnetization is oriented in the plane.

TABLE 3

|  | a[Å] | c[Å] | Co [0001] direction | Co [1210] direction |
| --- | --- | --- | --- | --- |
| CoCr$_{20}$Pt$_{12}$ | 2.58 | 4.14 | 4.14 | 2.58 |
| CrTi$_{20}$ | 2.95 | — | 4.19 | 2.56 |
| Cr | 2.88 | — | 4.08 | 2.50 |
| AlNi$_{50}$ | 2.88 | — | 4.07 | 2.50 |

Figure 1:
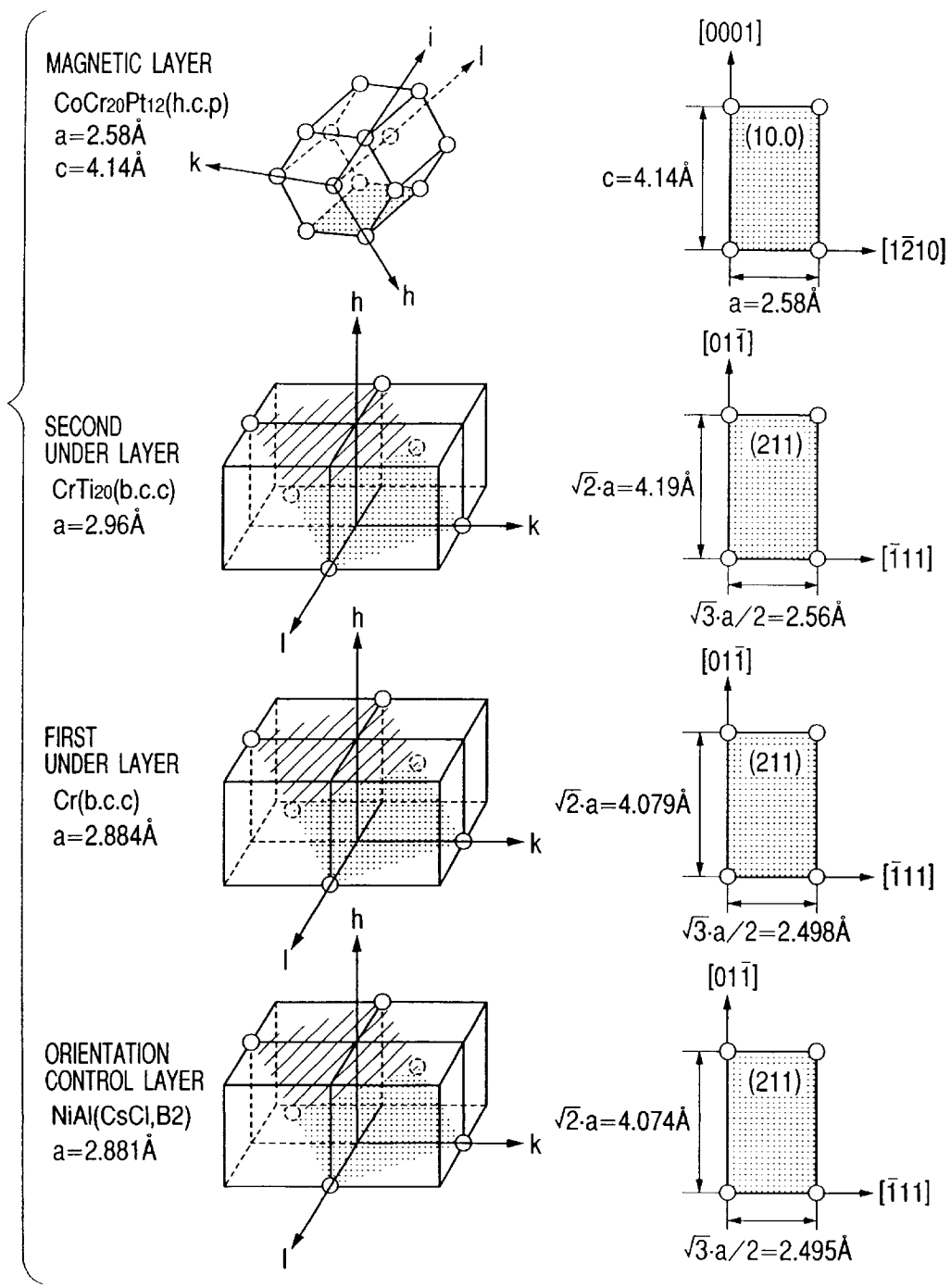
FIG. 1 is a diagrammatic view for explaining an epitaxial relationship between an underlayer and a magnetic layer of a magnetic recording medium according to the present invention.
Figure 2:
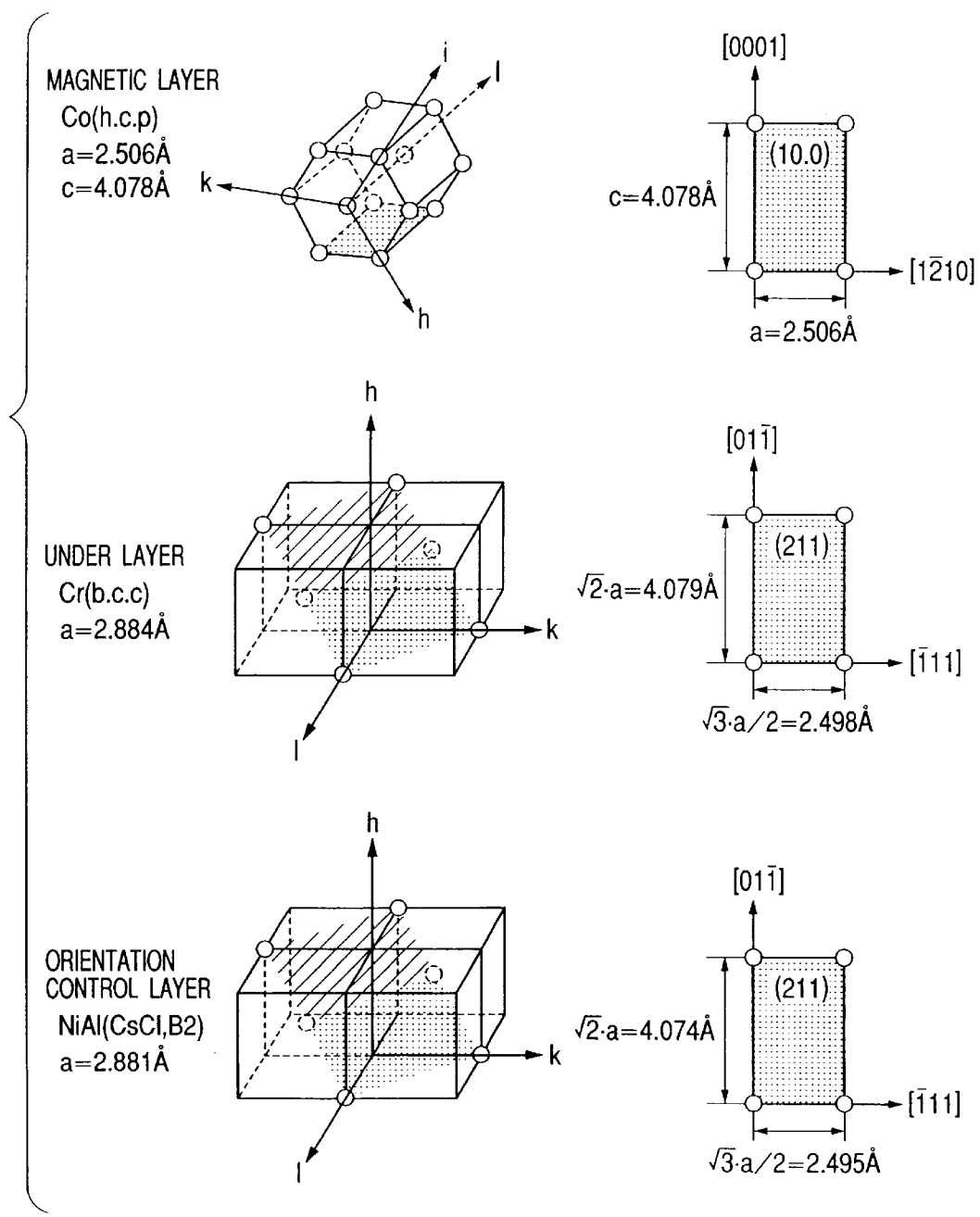
FIG. 2 is a diagrammatic view for explaining an epitaxial relationship between an underlayer and a magnetic layer of a magnetic recording medium in the prior art.

Table 3 shows the lattice constant for the AlNi orientation control layer, the first Cr underlayer, the second CrTi underlayer and the CoCrPt magnetic layer, and the length for the side of a rectangle formed by each of the layers shown in FIG. 1. It can be seen that the length for the side of the second CrTi underlayer is somewhat longer in the [0001] direction, but somewhat shorter in the [1–210] direction, compared with the length of the side of the rectangle formed by the magnetic layer. On the other hand, in the medium of the structure of Comparative Example 2 proposed by CMU, the magnetic layer is formed directly on the first Cr underlayer, and it can be seen that the side length is shorter compared with that of the magnetic layer both in the [0001] direction and in the [1–210] direction. If such a size difference exists, the in-plane orientation of the axis of easy magnetization is deteriorated and the coercivity is lowered.

Further, similar effects could also be obtained when varying the composition of the orientation control layers 31, 31' as: Al-50 at. %Co, Al-50 at. %Fe, Al-50 at. %Pd, Co-50 at. %Ga, Co-50 at. %Fe, Co-50 at. %Ti, Cu-50 at. %Pd, Cu-50 at. %Zn, Ga50 at. %Ni, Ga-50 at. %Rh and Ru-50 at. %Si.

Explanation will be made for an example of a longitudinal magnetic recording medium representing a second preferred embodiment according to the present invention. While a glass substrate was used in the previous embodiment, an Ni—P plated Al alloy substrate of 95 mmφ in outer diameter was used in the second embodiment. Since the layer structure is identical with the structure shown in FIG. 3, only the manufacturing method needs to be explained.

At first, onto the Ni—P plated Al alloy substrate 30 of 95 mmφ in outer diameter, orientation control layers 31, 31' comprising Al-50 at. %Co were each formed to a depth of 15 nm by a DC magnetron sputtering method under the deposition conditions including a substrate temperature of 270° C., an Ar gas pressure of 2.0 mtorr and with a charged power density of 0.7 W/cm². Then, under the same deposition conditions, first Cr underlayers 32, 32I and second Mo underlayers 33, 33' comprising Cr-40at. %Mo were formed, and magnetic layers 33, 34' comprising Co-17 at. %Cr-10 at. %Pt-4 at. %Ta were formed successively each to a depth of 20 nm. Finally, C was formed to a depth of 10 nm as the C protective layers 35, 35'. In this case, mediums were manufactured while changing the film thickness for the first Cr underlayer and the second CrMo underlayer. In each of the thus prepared mediums, the thickness for the first Cr underlayer was made identical with that of the second CrMo underlayer.

Figure 4:
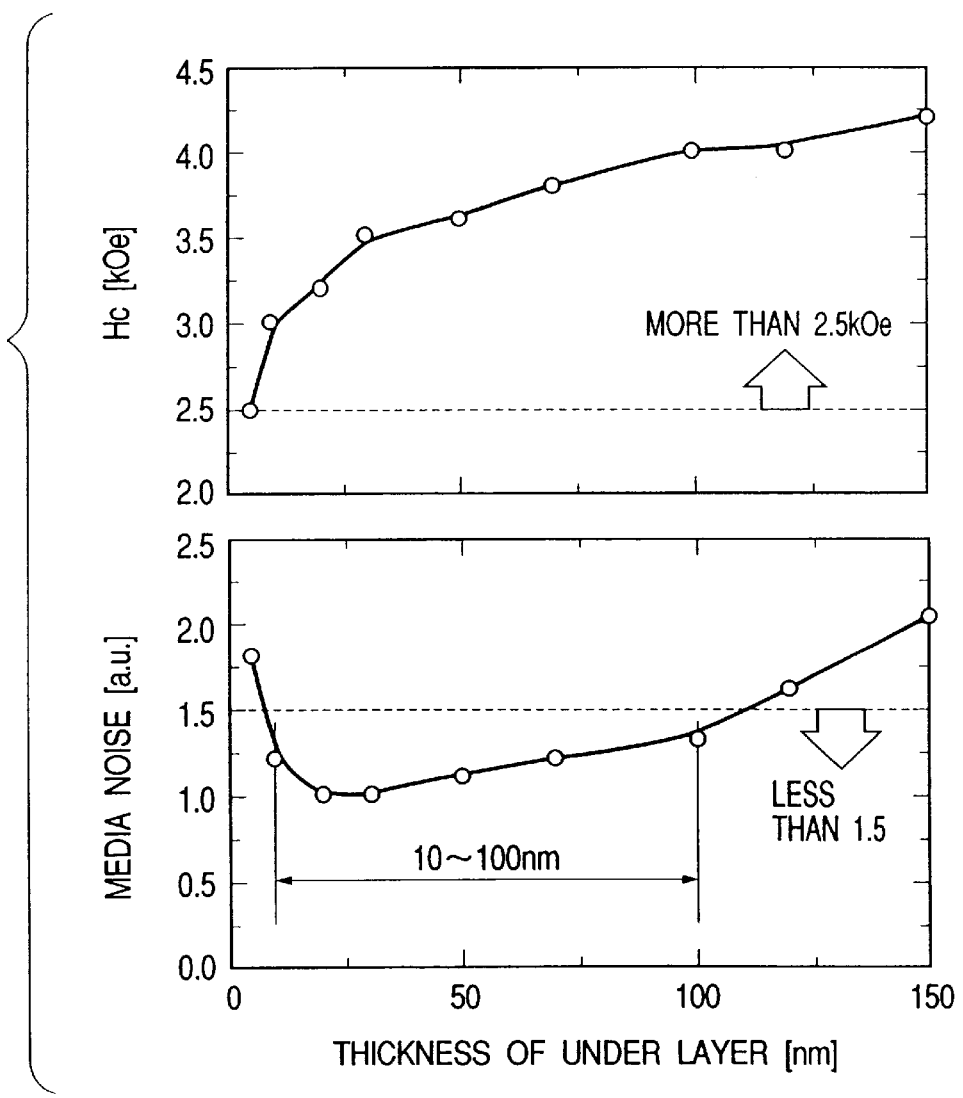
FIG. 4 is a graph illustrating the dependence on the underlayer thickness of the coercivity and the medium noise.

FIG. 4 is a graph showing the dependence, based on the underlayer film thickness, of the coercivity and the media noise measured for the medium of the second embodiment according to the present invention as described above. In FIG. 4, the abscissa of the graph indicates the thickness of the films in total of the first Cr underlayer and the second CrMo underlayer (thickness ratio 1:1)[nm]. The ordinate of the upper portion of the graph shows coercivity Hc[kOe] and the ordinate of the lower portion of the graph shows media noise [a.u.].

For improving the capability of writing signals at a high density, the coercivity is required to be at least 2.5 kOe or more and, it is important for the media noise to be 1.5 a.u. or less. It can be seen from the graph in FIG. 4 that, if the total thickness for the underlayers is decreased to 10 nm or less, the coercivity lowers abruptly and the media noise increases. This is attributable to the fact that the defects at the initial stage of crystal growing are not moderated since the underlayers are excessively thin and the defects give undesired effects also on the magnetic layers. On the other hand, if the thickness for the total of the underlayers exceeds 100 nm, the media noise will increase remarkably. This is considered to be due to the fact that the crystal grain size of the underlayers is made coarser, and, along therewith, the crystal grain size of the magnetic layers also grows larger. That is, it is necessary for the total thickness of the underlayers to be 10 nm or more and 100 nm or less.

Figure 5:
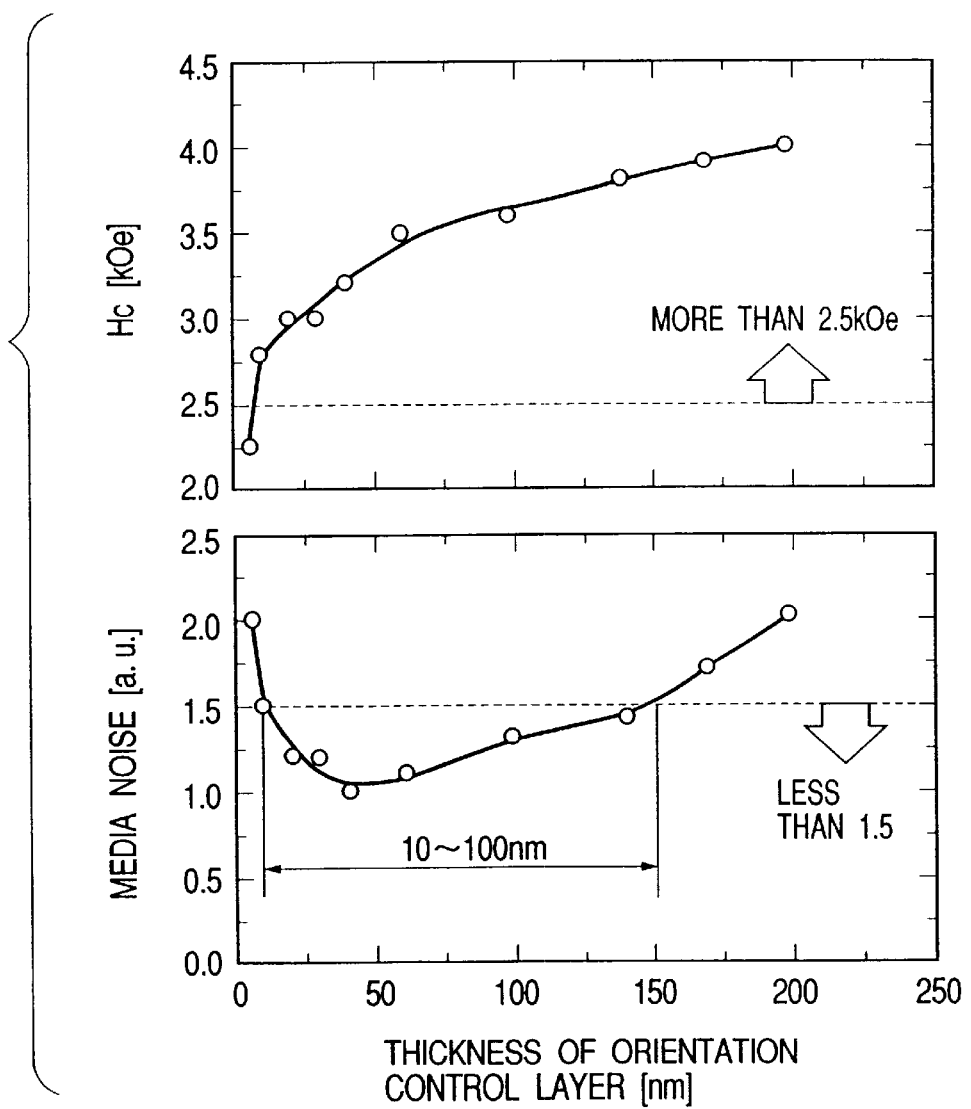
FIG. 5 is a graph illustrating the dependence on the thickness of the orientation control layer of the coercivity and the media noise measured by manufacturing a medium having a constant thickness for the total of the underlayer.

FIG. 5 is a graph showing the dependence, based on the layer thickness of the orientation control layer, of the coercivity and the media noise measured in mediums having a total thickness of 10 mm for the underlayers while varying the thickness of the Al—Co orientation control film. In FIG. 5, the abscissa of the graph shows the film thickness (nm) of the orientation control layer, the ordinate in the upper portion shows the coercivity Hc[kOe] and the ordinate in the lower portion the media noise [a.u.].

Examples of the measurement shown in FIG. 5 were for mediums having underlayers with a total thickness of 10 nm and an Al—Co orientation control layer of various thicknesses. It can be seen from the graph shown in FIG. 5 that the thickness of the orientation control layer has to be 5 nm or more and 50 nm or less.

In the second embodiment of the present invention described above, an example in which 4% Ta is added to the magnetic layer was proposed, but a similar effect could also be obtained in a case of adding Ti or Nb, instead of Ta.

Further, a magnetic recording medium was prepared by successively forming, on an Ni—P plated Al alloy substrate of 95 mmϕ in outer diameter, a first Cr underlayer and a second underlayer comprising Cr-40at. %Mo, each to a depth of 20 nm, and magnetic layers comprising Co-10 at. %Cr-10 at. %Pt-4 at. %Ta, each to a depth of 20 nm as Comparative Example 4.

Explanation will be made for the result of comparison and evaluation between this recording medium and the recording medium having a structure identical to the embodiment of the present invention, except for provision of the AlCo orientation control layer in view of the thermal fluctuation.

In the medium of Comparative Example 4, the CrTi underlayer shows a (100) orientation and the magnetic layer thereon shows (11.0) orientation. In the medium having such an orientation, two types of magnetic particles having their axes of easy magnetization in the magnetic layer perpendicular to each other are grown on one underlayer crystal grain (bi-crystal structure) Such crystal growth occurs because both the crystal grains in the underlayer and the crystal grains in the magnetic layer form normal square crystal lattices. The effect of the thermal fluctuation was evaluated by recording signals at 250 KFCI and comparing the decreasing ratio of the read output after 96 hrs.

While the magnetic recording medium according to the embodiment of the present invention had a 3% decreasing ratio for the read output, it was 12% in the medium of the Comparative Example 4. The medium of the bi-crystal structure tends to undergo the effect of thermal fluctuation, since the crystal grain size in the magnetic layer is highly dispersed and many fine crystal grains are present. On the other hand, in the medium according to the present invention, as shown in FIG. 1, since the crystal lattice for each of the underlayer and the magnetic layer is rectangular, only one magnetic particle grows on one crystal grain of the underlayer. For this reason, it could be confirmed that the magnetic recording medium according to the present invention is less subject to the effect of the thermal fluctuation by nature.

Further, when a non-magnetic h.c.p. intermediate layer comprising Co-35at. %Cr was disposed between the second CrMo underlayer and the CoCrPtTa magnetic layer on the magnetic recording medium in each of the embodiments according to the present invention described above, the decreasing ratio of the read output could be reduced to as low as 1.5%.

Now, an embodiment of a magnetic storage apparatus using the magnetic recording mediums according to the first and the second embodiments of the present invention, as described above, will be explained.

Figure 6:
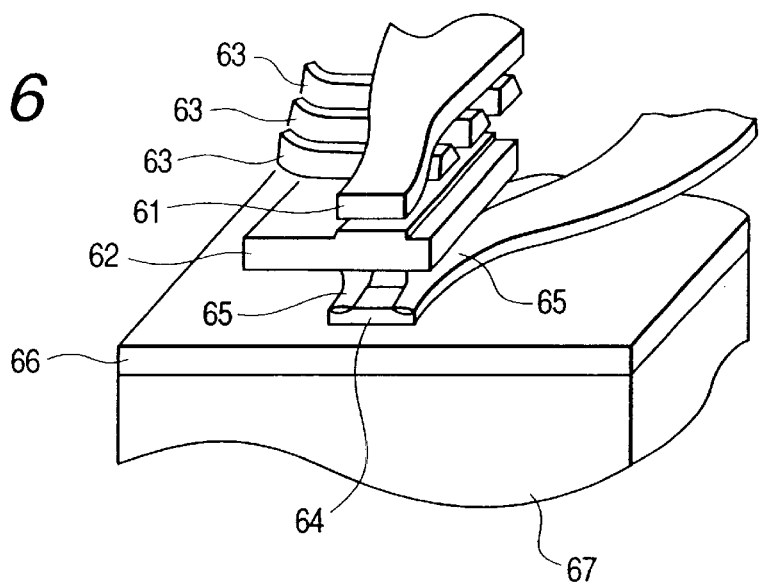
FIG. 6 is a perspective view showing an example of a magnetic head having a device utilizing a magnetoresistive effect.
Figure 7:
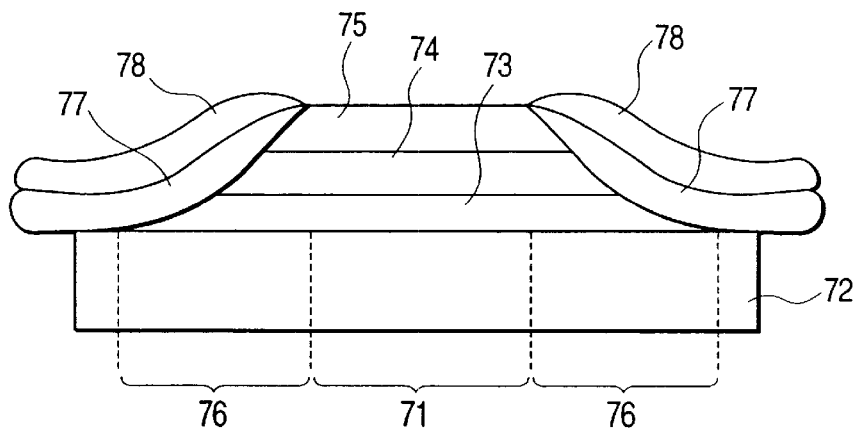
FIG. 7 is a plan view showing an example of a magnetoresistive sensor.

FIG. 6 is a schematic view showing an example of the structure of a magnetic head having a device utilizing the magnetoresistive effect, FIG. 7 is a view showing an example for the structure of a spin-valve type magnetoresistive sensor and FIG. 9 is a schematic view showing an example of the structure of the magnetic storage apparatus. In FIG. 6 to FIG. 9, the structure comprises a recording magnetic pole 61, a magnetic medium driving system 62 also serving as a magnetic pole, a coil 63, a magnetoresistive device 64, a conductive layer 65, a magnetic shield layer 66, a slider substrate 67, a signal sensing region 71 of the magnetic sensor, a gap layer 72, a transversal biasing layer 73, a separating layer 74, a magnetoresistive ferromagnetic layer 75, a tapered region 76, a permanent magnet layer 77, electrodes 78, 80, a signal detection region 81 of the magnetic sensor, a gap layer 82, buffer layer 83, a first magnetic layer 84, an intermediate layer 85, a second magnetic layer 86, an antiferromagnetic alloy layer 87, a tapered region 88, a permanent magnet layer 89, a magnetic recording media driving system 92, a magnetic head 93, a read/write signal processing system 94 and a head access system 95.

The magnetic recording medium of the preferred embodiments 1, 2 according to the present invention, as described above, can fully take advantage of the performance thereof by using a magnetic head having a read only sensor utilizing the magneto-resistive effects shown as an example in FIG. 6.

As shown in FIG. 6, the recording magnetic head is an induction type thin film magnetic head comprising a pair of recording magnetic poles 61, 62 with the coils 63 crossing therewith in view of magnetic fluxes. The thickness of the gap layer between the recording magnetic poles is defined as 0.3 μm. The magnetic pole 62 is paired with the magnetic shield layer 68, each of 1 μm thickness, and it also serves as a magnetic shield for the read out magnetic head, with the distance relative to the shield layer being 0.25 μm. The read out only magnetic head is a magnetoresistive head comprising a magnetoresistive sensor 64 and a conductive layer 65 serving as the electrode. The magnetic head is disposed on the magnetic head slider substrate 67. In FIG. 6, the gap layer between the recording magnetic poles and the gap layer between the shield layer and the magnetoresistive sensor are not shown.

The magnetoresistive sensor 64 comprises, as shown in the detailed cross sectional structure of FIG. 7, the signal detection region 71 of the magnetic sensor and tapered regions 76 adjacent thereto on both sides thereof. The signal detection region 71 has a structure in which the transversal biasing layer 73, the separating layer 74 and the magnetoresistive ferromagnetic layer 75 are formed successively on the gap layer 72 made of aluminum oxide. An NiFe alloy of 20 nm thickness was used for the magnetoresistive ferromagnetic layer i5. An NiFeNb of 25 nm thickness was used for the transversal biasing layer 73, but it may be made of a ferromagnetic alloy having relatively high electric resistance and soft magnetic characteristics, such as NiFeRh.

The transversal biasing layer 73 is magnetized in the in-plane direction (transversal direction) perpendicular to a sense current flowing through the magnetoresistive ferromagnetic layer 75 by magnetic fields formed by the sense current, and it applies a transversal biasing magnetic field to the magnetoresistive ferromagnetic layer. This provides a magnetic sensor capable of obtaining a linear read output relative to leakage magnetic fields from the medium. The separation layer 74 for preventing shunting of the sense current from the magnetoresistive ferromagnetic layer 75 is made of Ta having a relatively high electric resistance and formed to a thickness of 5 nm. The tapered regions 76 fabricated into a tapered shape and disposed on both sides of the signal detection region 71 comprise the permanent magnet layer 77 for magnetizing the magnetoresistive ferromagnetic layer 75 into a single domain and a pair of electrodes 78 formed thereon for taking out signals. It is important for the permanent magnet layer 97 to have a high coercivity and to not easily change its direction of magnetization, for which CoCr, a CoCrPt alloy or the like is used.

Figure 8:
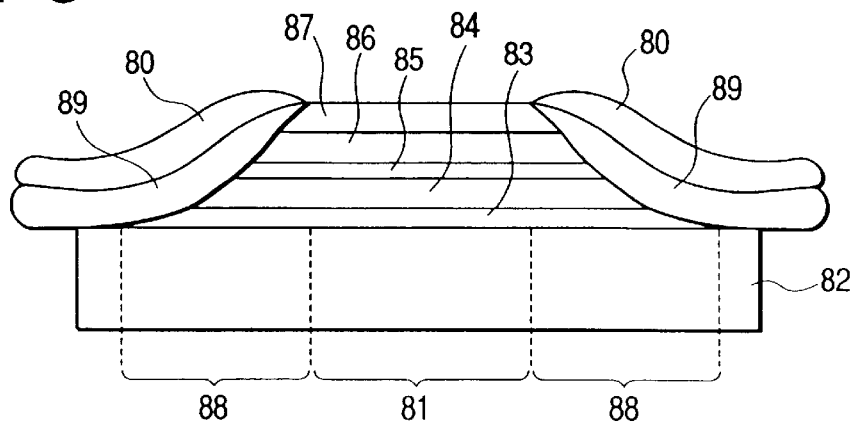
FIG. 8 is a plan view showing an example of a spin-valve type magnetoresistive sensor.

Further, as the magnetoresistive sensor 64, a spin-valve type as shown in FIG. 8 can be used in which higher read output can be obtained. The magnetoresistive sensor 64 shown in FIG. 8 comprises the signal detection region 81 of the magnetic sensor and tapered regions 88 adjacent thereto on both sides thereof. The signal detection region 81 of the magnetic sensor has a structure in which a Ta buffer layer 83 of 5 nm, the first magnetic layer 84 of 7 nm, the Cu intermediate layer 85 of 1.5 nm, the second magnetic layer 86 of 3 nm and Fe50 at. %Mn anti-ferromagnetic alloy layer 87 are formed successively on the gap layer 82 made of aluminum oxide. A Ni-20 at. %Fe alloy was used for the first magnetic layer 84 and Co was used for the second magnetic layer 86. The second magnetic layer 86 is magnetized by an exchange field from the anti-ferromagnetic alloy layer 87 and fixed in one direction. On the contrary, the direction of magnetization of the first magnetic layer 84 adjacent to the second magnetic layer 86 by way of the non-magnetic intermediate layer 85 changes depending on the leakage magnetic fields from the magnetic recording medium.

In accordance with the change of the relative direction of the magnetization in the two magnetic layers described above, the resistance of the entire three layers is changed. This phenomenon is referred to as a spin-valve effect, and a spin-valve type magnetic head utilizing this effect was used for the magnetoresistive sensor in the magnetic storage apparatus of the preferred embodiment according to the present invention. The tapered region 88 comprising the permanent magnet layer 89 and the electrode 80 is identical with the usual magnetoresistive sensor shown in FIG. 7.

Figure 9A:
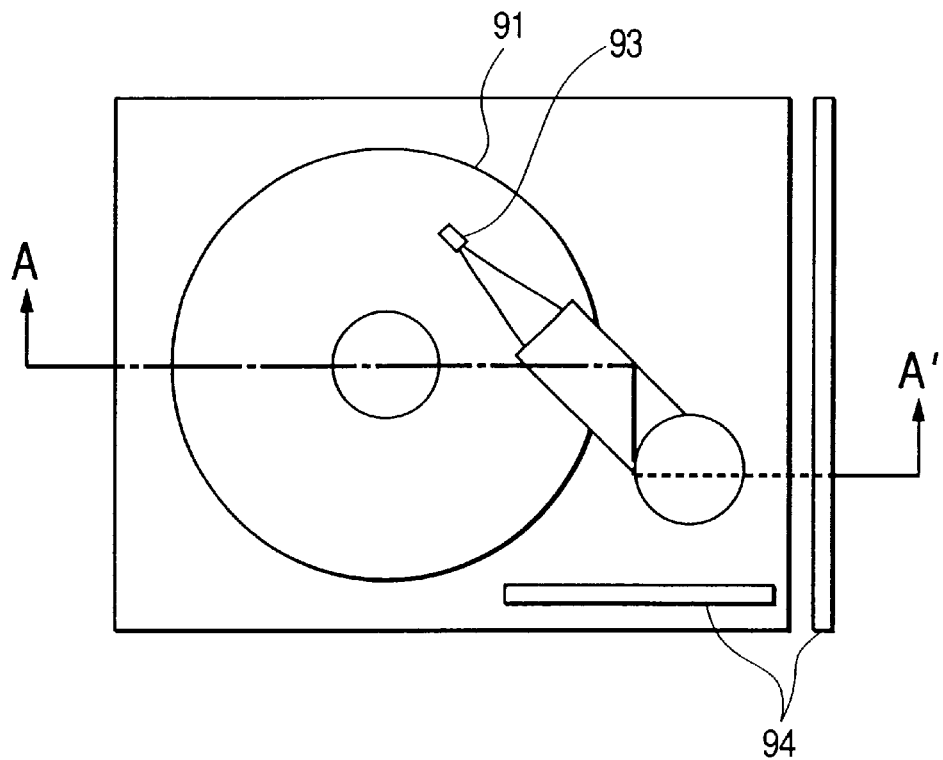
FIG. 9(a) is a top plan view and FIG. 9(b) is a side view showing of a magnetic storage apparatus.
Figure 9B:
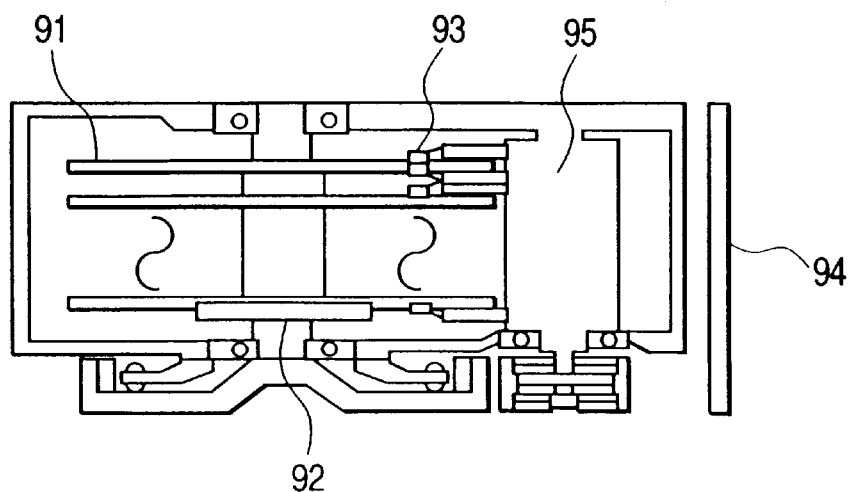

An example of the magnetic storage apparatus of the preferred embodiment according to the present invention is constituted as shown in FIG. 9(a) for the upper surface and in FIG. 9(b) as a cross section taken along line A–A' in FIG. 9(a).

That is, in the magnetic storage apparatus, a longitudinal magnetic recording medium 91 is held by a holder connected to a longitudinal magnetic recording medium driving system 92, and a magnetic head 93 described with reference to FIG. 6 is disposed to oppose each of the surfaces of the longitudinal magnetic recording medium 91. The magnetic head 93 is floated stably at a low flying height of 0.05 μm or less and is driven by a magnetic head driving system 95 to a desired track at a head positioning accuracy of 0.5 μm or less.

Signals read out by the magnetic head 93 are subjected to waveform processing by a read/write signal processing system 94. The read/write signal processing system comprises an amplifier, an analog equalizer, an AD converter, a digital equalizer, and a maximum likelihood signal decoder. Waveforms read out from the head utilizing the magnetoresistive effect may sometimes be read erroneously as signals different from recorded signals due to a symmetricity for the positive and negative levels of the signals owing to the head characteristics or the effect of the frequency characteristics of the read/write system. The analog equalizer has a function of shaping the read out waveforms and processing the same. Signals having the processed waveform are converted digitally through the AD converter and further shaped for the waveform by the digital equalizer. Finally, the processed signals are decoded into most plausible data by the maximum likelihood signal decoder.

The magnetic storage apparatus of the preferred embodiment according to the present invention can read/write signals at an extremely low error rate using a read out signal processing system having the constitution described above. Existent equalizers or maximum likelihood signal decoder may be used.

The magnetic storage apparatus according to the preferred embodiment of the present invention can cope with a recording density at 3 Gbit or higher per square inch by having the apparatus constitution described above and provide a high density magnetic storage apparatus having a storage capacity of three times or more compared with existent magnetic storage apparatus. Furthermore, in a case where the maximum likelihood signal decoder is removed from the write/read signal processing system and replaced with an existent waveform discriminator, a magnetic storage apparatus having a storage capacity of twice or more compared with the prior art could be attained.

While explanation has been made for the preferred embodiment according to the present invention as described above for an example of a disk-shaped magnetic recording medium and a magnetic storage apparatus using the same, the present invention is applicable also to a tape or card magnetic recording medium having a magnetic layer only on one surface, and a magnetic storage apparatus using such magnetic recording medium.

Further, the method of manufacturing the magnetic recording medium in accordance with the present invention is not restricted to the DC magnetron sputtering method, but other methods such as an ECR sputtering method, ion beam sputtering method, vacuum deposition method, plasma CVD method, coating methods, plating method and the like can also be used.

As has been described above, according to the present invention, a magnetic recording medium having high coercivity, and low noise and which undergoes less effect of thermal fluctuation can be obtained by disposing the orientation control layer having at least a B2 (CsCl) structure on the substrate, disposing thereon the first underlayer comprising Cr and the second underlayer containing at least one element selected from Cr, Nb, Mo, Ta, W and Ti and having a lattice constant greater than that of the first underlayer comprising Cr and then forming the magnetic layer comprising Co as the main ingredient.

Further, a magnetic storage apparatus having a recording density at 3 Gbit or more per one square inch can be obtained by combining the magnetic recording medium according to the present invention and a magnetic head having a read out only device utilizing the magnetoresistive effect.

What is claimed is:

1. A longitudinal magnetic recording medium comprising an orientation control layer having at least a B2 (CsCl) structure disposed on a substrate and, having disposed thereon successively, a first underlayer comprising Cr and a second underlayer containing at least one element selected from Cr, Nb, MO, Ta, W and Ti and having a lattice constant greater than that of the first underlayer and a magnetic layer comprising Co as the main ingredient, wherein when the crystallographic orientation of the magnetic layer is measured by X-ray diffractiometry, (10.0) of an h.c.p. structure is detected, but (11.0) of the h.c.p structure is not detected in the plane parallel with the substrate.

2. A longitudinal magnetic recording medium as defined in claim 1, wherein an intermediate layer comprising a material in which Cr is added by at least 25 at. % or more to Co is disposed between the second underlayer and the magnetic layer.

3. A longitudinal magnetic recording medium as defined in claim 1, wherein at least the second underlayer has a b.c.c. structure.

4. A longitudinal magnetic recording medium as defined in claim 1, wherein both of the first underlayer and the second underlayer have a b.c.c. structure.

5. A magnetic storage apparatus including a longitudinal magnetic recording medium comprising an orientation control layer having at least a B2 (CsCl) structure disposed on a substrate and, having disposed thereon successively, a first underlayer comprising Cr and a second underlayer containing at least one element selected from Cr, Nb, Mo, Ta, W and Ti and having a lattice constant greater than that of the first underlayer and a magnetic layer comprising co as the main ingredient, wherein when the crystallographic orientation of the magnetic layer is measured by X-ray diffractiometry, (10.0) of an h.c.p. structure is detected, but (11.0) of the h.c.p structure is not detected in the plane parallel with the substrate, and a driving system for driving the magnetic recording medium in the recording direction, a magnetic head comprising a recording system and a read out system, a unit for moving the magnetic head relative to the magnetic recording medium, and a read/write signal processing system.

6. A magnetic storage apparatus as defined in claim 5, wherein the read out head system of the magnetic head comprises a magnetoresistive effect device.

7. A magnetic storage apparatus as defined in claim 5, wherein at least the second underlayer has a b.c.c. structure.

8. A magnetic storage apparatus as defined in claim 5, wherein both of the first underlayer and the second underlayer have a b.c.c. structure.

9. A longitudinal magnetic recording medium as defined in claim 5, wherein an intermediate layer comprising a material in which Cr is added by at least 25 at. % or more to Co is disposed between the second underlayer and the magnetic layer.

* * * * *